United States Patent [19]
Furuichi et al.

[11] Patent Number: 6,072,670
[45] Date of Patent: Jun. 6, 2000

[54] THIN FILM MAGNETIC HEAD HAVING A PAIR OF MAGNETIC POLES FORMED ON SUBSTRATE THROUGH A MAGNETIC GAP LAYER

[75] Inventors: Shinji Furuichi; Kuniaki Yoshimura, both of Mooka, Japan

[73] Assignee: Hitachi Metals, Ltd., Tokyo, Japan

[21] Appl. No.: 09/041,000

[22] Filed: Mar. 19, 1998

[30] Foreign Application Priority Data

Apr. 3, 1997 [JP] Japan ................................ 9-099603

[51] Int. Cl.⁷ .................................................. G11B 5/147
[52] U.S. Cl. ............................................................ 360/126
[58] Field of Search ............................................. 360/126

[56] References Cited

U.S. PATENT DOCUMENTS

| | | | |
|---|---|---|---|
| 5,649,351 | 7/1997 | Wade | 360/126 |
| 5,802,700 | 9/1998 | Chen | 360/126 |

FOREIGN PATENT DOCUMENTS

| | | |
|---|---|---|
| 5-189720 | 7/1993 | Japan . |
| 5-303719 | 11/1993 | Japan . |
| 5-342527 | 12/1993 | Japan . |
| 6-28626 | 2/1994 | Japan . |
| 8-180323 | 7/1996 | Japan . |

Primary Examiner—A. J. Heinz

[57] ABSTRACT

A thin film magnetic head has, on the rear side of one and the other magnetic poles 2, 5 in the shape of a film formed on a substrate, a coil layer around a connection between both the magnetic poles, and on the end side of one and the other magnetic poles, a magnetic gap layer 3 between both the magnetic poles, and a non-magnetic track width regulating member 8 is provided on the opposite sides of both the magnetic poles 2, 5 and the magnetic gap layer 3, wherein the end of each track width regulating member 8 is positioned between the ends close to and distant from the magnetic gap layer in the other magnetic pole, and the other magnetic pole 5 formed by plating covers partially at least a portion of the end of each track width regulating member, or the end surfaces close to and distant from the magnetic gap layer in the other magnetic pole 5 are not parallel to each other. Thus, both the magnetic poles 2, 5 in the gap portion are formed to have the uniform and small width with high precision, resulting in prevention of side-fringing.

6 Claims, 7 Drawing Sheets

(a) FORMATION OF A NON-MAGNETIC SUBSTRATE (b) FORMATION OF A LOWER MAGNETIC POLE (c) FORMATION OF A TRACK WIDTH REGULATING MEMBER (d) FORMATION OF A LOWER MAGNETIC POLE BETWEEN TRACK WIDTH REGULATING MEMBERS (e) FORMATION OF A MAGNETIC GAP LAYER (f) FORMATION OF AN UPPER MAGNETIC POLE BETWEEN AND ON TRACK WIDTH REGULATING MEMBERS ary to form a taper portion 104 by machining on each
THIN FILM MAGNETIC HEAD HAVING A PAIR OF MAGNETIC POLES FORMED ON SUBSTRATE THROUGH A MAGNETIC GAP LAYER

BACKGROUND OF THE INVENTION

1. Field of the Invention

This invention relates to a thin film magnetic head, and more particularly, to a thin film magnetic head having a pair of magnetic poles formed on a substrate through a magnetic gap layer.

2. Description of the Related Art

A thin film magnetic head comprises a gap portion which is composed of a magnetic pole in the shape of a film formed on a substrate, a magnetic gap layer formed above the magnetic pole, and another magnetic pole in the shape of a film. A thin film magnetic head is formed by covering the gap portion with a protection layer. An end surface of the gap portion in the thin film magnetic head is allowed to face a magnetic medium so as to form a magnetic circuit by one magnetic pole, the magnetic medium and the other magnetic pole, and recording and read back for the magnetic medium are performed by making use of a magnetic variation occurring in the magnetic circuit. Thus, the recording/read back characteristics of the thin film magnetic head are largely dependent on the shape and size of one and the other magnetic poles in the gap portion.

The magnetic poles in the thin film magnetic head have been heretofore formed by various methods including a method of forming one and the other magnetic poles by sputtering using a mask, a method of forming one and the other magnetic poles of a predetermined size by ion milling after deposition, and a method of forming one and the other magnetic poles of a predetermined size by chemical etching after deposition by plating and so on. These conventional methods have problems in respect of working precision, impurity deposition and side etching or the like.

Further, since a track width (corresponding to a width of a magnetic recording line of a magnetic medium) in the gap portion of the thin film magnetic head is in need of being remarkably reduced to, for instance, 2 to 4 μm for higher recording density, it is difficult to manufacture one and the other magnetic poles of uniform width in case of applying deposition to formation of the magnetic poles, and besides, it is difficult to align one and the other magnetic poles, so that it is hard to form the thin film magnetic head having a track width of a predetermined size by forming one and the other magnetic poles of uniform width. Thus, according to the conventional thin film magnetic head, one magnetic pole is formed wider than the other magnetic pole to hold down a variation of the track width caused by positional deviation or the like. However, the thin film magnetic head having both the magnetic poles different in width from each other causes a leakage magnetic field between the opposite edges of both the magnetic poles, resulting in occurrence of side-fringing unfavorable for magnetic recording and read back.

As a configuration to prevent side-fringing from occurring in the thin film magnetic head by making both the magnetic poles of uniform width, there is known a thin film magnetic head, in which impurities are added to one magnetic pole to make both the magnetic poles of substantially uniform width (Japanese Patent Application Laid-open No. 5-189720), or a thin film magnetic head, in which both the magnetic poles in the gap portion are cut in a size of a track width by etching (Japanese Patent Application Laid-open No. 5-303719).

Further, to meet the required precision of both the magnetic poles with demands for smaller size and higher density, there is proposed a thin film magnetic head having a track width regulating member adapted to make both the magnetic poles of uniform width. FIGS. 12 and 13 are schematic views showing conventional thin film recording heads each having a track width regulating member. As a matter of convenience, the description will now be given on the assumption that a reference position is at the substrate side.

In the thin film magnetic head (Japanese Patent Application Laid-open No. 5-342527) shown in FIG. 12, one magnetic pole 102 is formed on a substrate 101, and a non-magnetic film 108 is then formed on the opposite sides of one magnetic pole 102. Subsequently, a magnetic gap layer 103 and the other magnetic pole 105 are formed by sputtering between the non-magnetic films 108 by using the non-magnetic films 108 as a track width regulating member.

Further, in the thin film magnetic head (Japanese Patent Application Laid-Open No. 8-180323) shown in FIG. 13, a pair of track width regulating members 118 are provided at an interval corresponding to a track width (Tw) on one magnetic pole 112 formed on a substrate 111, and one magnetic pole 112a, a magnetic gap layer 113 and the other magnetic pole layer 115 are formed between the track width regulating members 118 to define a gap portion.

In the conventional thin film magnetic heads described above, although the upper and lower magnetic poles of uniform width may be formed by using the track width regulating members, these thin film magnetic heads have problems in respect of precision in film formation and undershoot output. Further, it is difficult to meet a demand for smaller track width.

For instance, in the thin film magnetic head shown in FIG. 12, the track width is determined depending on the width of one initially-formed magnetic pole 102. Further, it is necessary to form a taper portion 104 by machining on each non-magnetic track width regulating film 108 for the purpose of allowing the other magnetic pole 105 to satisfactorily deposit on the non-magnetic track width regulating films 108 by sputtering. Thus, depositing and machining skill of high order is required for forming the non-magnetic track width regulating films 108 with required precision. Further, pole surfaces 105a, 105b of the other magnetic pole in the gap portion are parallel to each other. This parallel portion causes undershoot output.

Further, in the thin film magnetic head shown in FIG. 13, a groove of a track width is formed in the track width regulating member 118 by etching or the like, and the magnetic gap layer 113 and the other magnetic pole 15 are formed in the groove. Since the other magnetic pole 115 is received in the groove of the track width regulating member 118, it is difficult to increase the size of the track width regulating member 118 in a direction of array of the magnetic pole and the magnetic gap layer when a small track width (Tw) is required. That is, the lower limit of the track width is determined depending on the size (H) of the track width regulating member. Thus, it is difficult to form a thin film magnetic head meeting a demand for smaller track width.

OBJECT AND SUMMARY OF THE INVENTION

An object of the present invention is to provide a thin film magnetic head, in which one and the other magnetic poles in a gap portion are formed to have the uniform and small width with high precision. Another object of the present invention is to prevent side-fringing from occurring.

The summary of the present invention is as follows.

A thin film magnetic head has, on the rear side of one and other magnetic poles in the shape of a film, a coil layer around a connection between both the magnetic poles, and on the forward end side of one and other magnetic poles, a magnetic gap layer between both the magnetic poles. In this thin film magnetic head, one of the magnetic poles is a magnetic pole close to a substrate, and the other is a magnetic pole distant from the substrate.

In accordance with one aspect of the present invention, the thin film magnetic head further has a non-magnetic track width regulating member on the opposite sides of both the magnetic poles and the magnetic gap layer, wherein the end of each track width regulating member is positioned between the ends close to and distant from the magnetic gap layer in the magnetic pole distant from the substrate in a direction of array of both the magnetic poles, and a part of the same magnetic pole formed by plating covers at least a portion of the end of each track width regulating member.

The thin film magnetic head has a non-magnetic track width regulating member on the opposite sides of both the magnetic poles and the magnetic gap layer, wherein the end of each track width regulating member is positioned between the ends close to and distant from the magnetic gap layer in the magnetic pole distant from the substrate in a direction of array of both the magnetic poles, and an end surface distant from the magnetic gap layer in the same magnetic pole is not parallel to an end surface close to the magnetic gap layer in the same magnetic pole.

Since the track width regulating members serve as a member adapted for determining the width of both the magnetic poles in the gap portion and also making both the magnetic poles of uniform width, the end facing the magnetic gap layer in the magnetic pole distant from the substrate is made equal in width to the end facing the magnetic gap layer in the magnetic pole close to the substrate by the track width regulating members, resulting in prevention of side-fringing.

According to the present invention, since the end of each track width regulating member is positioned between the ends close to and distant from the magnetic gap layer in the magnetic pole distant from the substrate, and a part of the same magnetic pole formed by plating covers at least a part of the end of each track width regulating member, or the end surface distant from the magnetic gap layer in the magnetic pole distant from the substrate is not parallel to the end surface close to the magnetic gap layer in the same magnetic pole, it is possible to hold down the size of the track width regulating members in a direction of array of both the magnetic poles and the magnetic gap layer without losing a function of making both the magnetic poles of uniform width. As the result of holding down the size as described above, the track width regulating members may be formed easily even if a small track width is required.

Further, according to the present invention, the gap portion is a portion composed of portions of both the magnetic poles, in which the track width thereof is determined by the track width regulating members, and the magnetic gap layer.

The present invention may be applied to a thin film magnetic head having a regenerating portion and a recording portion separately from each other. The recording portion may be configured to have the track width regulating members described above.

The magnetic pole end surface distant from the substrate is protuberant from a plane including the end surfaces of both the track width regulating members to the side opposite to the magnetic gap layer and is shaped to gradually lower from the vicinity of a center line of both the track width regulating members toward both the track width regulating members. A sectional area of the magnetic pole distant from the substrate may be increased according to the shape of the end surface of the magnetic pole described above, resulting in reduction of magnetic reluctance. Further, when a protection layer is provided on the end surface of the magnetic pole distant from the substrate, it is possible to prevent a cavity from being formed owing to the shape of a step portion or the like.

Further, as the result of making the protection layer substantially equal in grinding properties to the track width regulating members, it is possible to obtain favorable characteristics for convenience in manufacture and for prevention of damages in movement on a magnetic medium or stability of a lifting distance of the magnetic head.

The track width regulating members may be made of at least one of silicon oxide, aluminum oxide, metal oxide, metal nitride and metal carbide, and may be allowed to have the grinding properties substantially equal to those of the protection layer by the use of these materials.

According to the thin film magnetic head of the present invention, by the aid of the pair of track width regulating members provided in the gap portion, both the magnetic poles in the gap portion may be formed to have the uniform width of a predetermined size with high precision, providing both magnetic pole portions of uniform width. Thus, it is possible to prevent side-fringing, resulting in improvement of recording/read back characteristics.

In manufacture of the thin film magnetic head, the pair of track width regulating members are formed at gap-forming positions on a non-magnetic substrate or one magnetic pole formed on the substrate. The distance between the track width regulating members is determined correspondingly to the track width of the gap portion. Since the size of each track width regulating member in the direction of deposition is held down to the small, it is possible to form the track width regulating members by deposition with high precision, even if a small track width is required. Further, after formation of the track width regulating members, the gap portion including both the magnetic poles and the magnetic gap layer is deposited by plating between the track width regulating members. Otherwise, the gap portion including both the magnetic poles formed by plating and the magnetic gap layer formed by sputtering is provided. In this deposition process, both the magnetic poles in the gap portion may be formed to have the uniform width with high precision according to the distance between the track width regulating members.

The magnetic pole protuberant from the end surfaces of the track width regulating members is shaped such that the upper surface of this magnetic pole reaches the highest level in the vicinity of the center line of the gap portion and is gradually lowered toward the track width regulating members according to plating isotropy, and the height of this magnetic pole varies gently. Thus, when the protection layer is formed on the surface of this magnetic pole, a difference in boundary edge level between the magnetic pole and the track width regulating members may be reduced to prevent a cavity from being formed in portions having a difference in level.

Further, since the track width regulating members are made of non-magnetic material, it is not necessary to remove the track width regulating members after formation of both the magnetic poles, resulting in process simplification.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENTS

An embodiment of the present invention will now be described with reference to the accompanying drawings.

Figure 1:
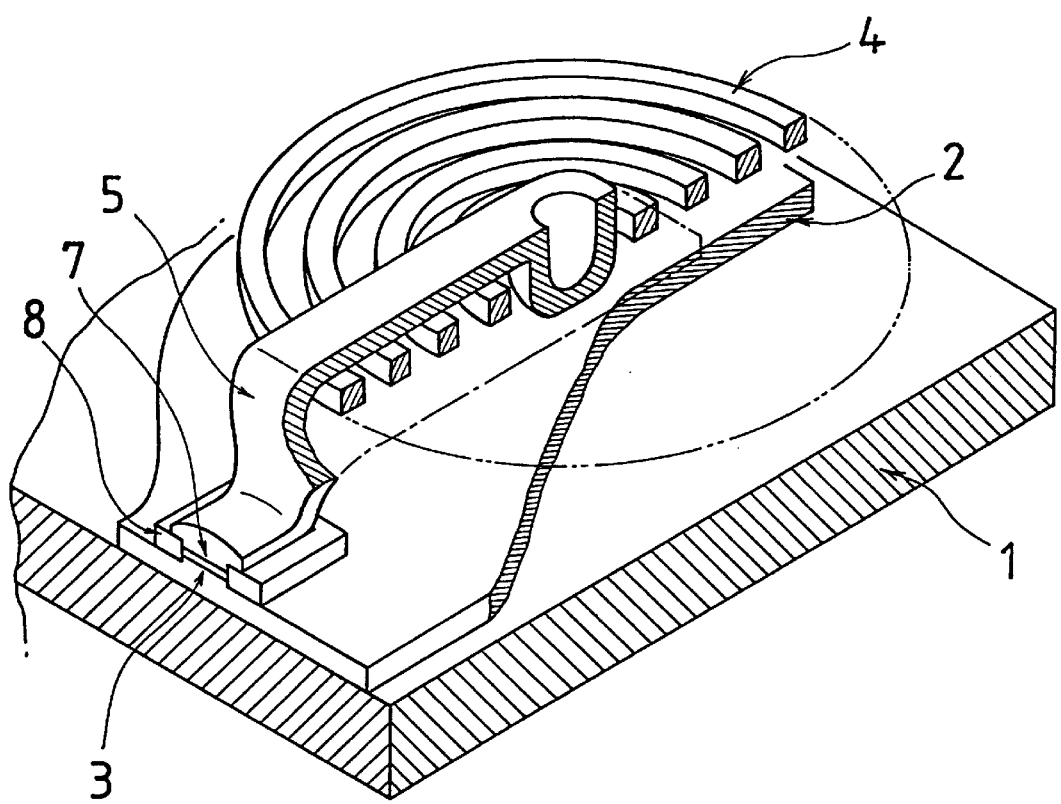
FIG. 1 is a perspective view for explaining a thin film magnetic head in one embodiment according to the present invention.

A description will now be given of a thin film magnetic head in one embodiment according to the present invention with reference to a perspective view in FIG. 1, a front view in FIG. 2 and sectional views in FIGS. 3 and 4. A lower magnetic pole 2 consisting of a permalloyplated layer, for instance, is formed on a non-magnetic substrate 1, and a coil layer 4 in the shape of a film is formed on the rear side of the lower magnetic pole 2 through an insulating layer. Incidentally, as a matter of convenience, the following description will be given on the assumption that the side of the substrate 1 is a reference position, and the side of the substrate 1 is referred to as a lower side, while the side of the magnetic pole formed on the substrate 1 is referred to as an upper side. In addition, a magnetic pole close to the reference position is referred to as the lower magnetic pole 2, while a magnetic pole distant from the reference position is referred to as an upper magnetic pole 5. The lower and upper magnetic poles 2 and 5 respectively correspond to one and the other magnetic poles in the above description.

The thin film magnetic head has a gap portion 7 facing a magnetic medium such as a magnetic disc. A pair of track width regulating members 8 are formed at the position of the gap portion 7 at an interval corresponding to a track width. A part of the lower magnetic pole 2, a magnetic gap layer 3 and a part of the upper magnetic pole are formed between the track width regulating members 8. Thus, the gap portion 7 is defined by portions, which are put between the track width regulating members 8, in both the magnetic poles 2 and 5 and the magnetic gap layer 3 put between both the magnetic poles 2 and 5.

The upper magnetic pole 5 is formed by plating such that the upper surface of the upper magnetic pole is protuberant upward from the upper end surfaces of the track width regulating members 8, and is shaped such that the upper surface reaches the highest level in the vicinity of a center line of the gap portion 7 and is gradually lowered toward the upper end surfaces of the track width regulating members 8, and the height of the upper surface varies gently. According to the shape of the upper magnetic pole described above, an end surface distant from the magnetic gap layer in the upper magnetic pole 5 serves as a surface which is not parallel to an end surface close to the magnetic gap layer in the same magnetic pole 5. The thin film magnetic head having the above configuration enables reduction of undershoot in the thin film magnetic head. Further, a sectional area of the magnetic pole may be increased, resulting in reduction of magnetic reluctance in a magnetic path.

The upper magnetic pole 5 may be formed of a permalloy-plated layer, for instance. The rear side of the upper magnetic pole 5 is connected to the lower magnetic pole 2 after passing through a center portion of the coil layer 4. Further, the lower magnetic pole 2, the magnetic gap layer 3 and the upper magnetic pole 5 are magnetically connected together in the gap portion 7 to form a magnetic circuit. The upper magnetic pole 5 and the coil layer 4 are covered with a non-magnetic protection layer 6 (not shown in FIG. 1).

Figure 2:
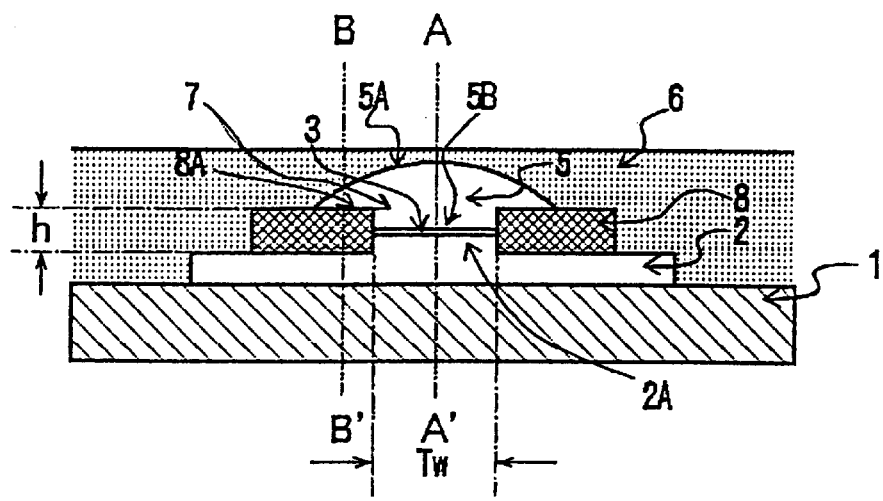
FIG. 2 is a front view for explaining the thin film magnetic head in one embodiment according to the present invention.
Figure 3:
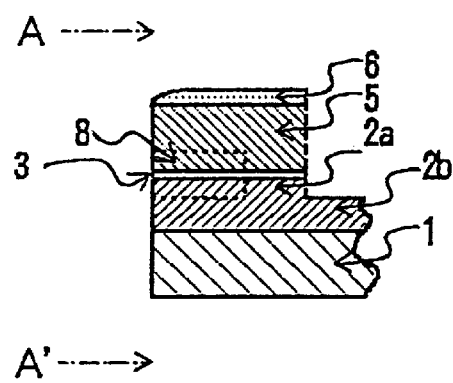
FIG. 3 is a sectional view for explaining the thin film magnetic head in one embodiment according to the present invention.
Figure 4:
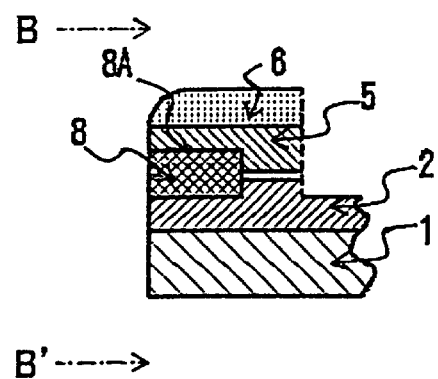
FIG. 4 is a sectional view for explaining the thin film magnetic head in one embodiment according to the present invention.

FIG. 2 is the front view showing the gap portion 7 as viewed from the magnetic medium side (not shown), and FIGS. 3 and 4 are the sectional views showing the sections taken along lines A-A' and B-B' in FIG. 2.

The gap portion 7 is defined by a part of the lower magnetic pole 2, the magnetic gap layer 3 and a part of the upper magnetic pole 5, and is arranged such that an end surface of the gap portion faces the magnetic medium. A track width (Tw) of the gap portion 7 is determined by putting the above parts 2, 3 and 5 between the pair of track width regulating members 8.

In the gap portion 7, an upper surface 2A of the lower magnetic pole 2 and a lower surface 5B of the upper magnetic pole 5 are positioned below an upper end surface 8A of each track width regulating member 8, and are put between the track width regulating members 8. As the result of arranging the lower and upper magnetic poles so as to have such a positional relation, the width of each of the magnetic poles 2 and 5 in the gap portion 7 becomes equal to the track width (Tw). Further, the upper magnetic pole 5 is formed such that an upper surface 5A is protuberant upward from the upper end surface 8A of each track width regulating member 8.

In the vicinity of the gap portion 7, the track width regulating members 8 in the shape of a weir, made of a non-magnetic material, are provided on the opposite sides of a portion 2a of the lower magnetic pole 2 and a portion of the upper magnetic pole 5, which compose of a gap portion. The width of each of the lower and upper magnetic poles 2, 5 in the gap portion 7 is regulated to be equal to the track width Tw by the distance between the pair of track width regulating members 8. The track width regulating members 8 may be made of materials more than one or two of silicon oxide, aluminum oxide, metal oxide, metal nitride and metal carbide or the like, and may be formed so as to show grinding resistance substantially equal to that of a protection layer which covers the circumference of the track width regulating members.

The opposite sides of the lower and upper magnetic poles 2 and 5 made of permalloy are covered with the alumina protection layer 6. In general, in case of lapping the end surface of the gap portion, a low hardness portion is ground more easily than a high hardness portion. Further, in the thin film magnetic head, when the lower and upper magnetic poles 2 and 5 are ground in a concave shape, a lifting distance serving as an interval between the magnetic medium and the magnetic head is substantially increased, resulting in reduction of magnetic recording characteristics. Thus, each material of the gap portion 2 has preferably less irregularities.

In the thin film-magnetic head according to the present invention, since the gap portion 7 and the track width regulating members 8 face the magnetic medium, it is preferable that the track width regulating members 8 have wear resistance similar to that of the gap portion 7, in respect of a hardness of the track width regulating members 8.

In general, the hardness of the non-magnetic substrate 1, if made of alumina titan carbide, is in the range of 2000 to 2500 in terms of Vickers hardness, while the hardness of the protection layer, if made of alumina, is in the range of 700 to 750 in terms of Vickers hardness. Thus, the track width regulating members 8 having the hardness in the range of 600 to 750 in terms of Vickers hardness are preferably required to make the track width regulating members and the gap portion 7 of uniform wear resistance. Incidentally, the hardness of the gap portion 7 is set to be in the range of 600 to 750 in terms of Vickers hardness, while the hardness in case of using permalloy as a magnetic material of the magnetic medium is about 100 in terms of Vickers hardness.

The track width regulating members 8 are formed such that their end surfaces facing the magnetic medium are exposed to the outside. Further, as shown in FIGS. 2 to 4, the upper end surface 8A of each track width regulating member 8 having a height h from the level of the lower magnetic pole 2 is above the lower surface 5B of the upper magnetic pole 5 and below the upper surface 5A thereof. Incidentally, the lower magnetic pole 2, the magnetic gap layer 3 and the upper magnetic pole 5 in the gap portion 7 are respectively about 1 $\mu$m, about 0.3 $\mu$m and about 1 $\mu$m in height, for instance. Thus, the height of each track width regulating member 8 comes to about 2.3 $\mu$m.

In the thin film magnetic head having the track width regulating members formed higher than the upper magnetic pole like the prior art, the track width regulating members of a height in the range of about 6 to 10 $\mu$m has to be formed when it is necessary to provide the track width Tw of, for instance, about 2 to 4 $\mu$m through regulation by the track width regulating members 8. On the other hand, according to the thin film magnetic head of the present invention, since it may be sufficient to form the track width regulating members of a height substantially equal to the track width, formation of the track width regulating members is facilitated, and it is possible to meet a demand for smaller track width.

Incidentally, in the upper magnetic pole 5, its portion above the upper end surface 8A of each track width regulating member 8 has a height of about 3 $\mu$m.

Further, the depth of each track width regulating member 8 directing inwardly from the surface facing the magnetic medium is in the range of about 0.01 to 5 $\mu$m, for instance, and the width of each track width regulating member 8 is in the range of about 2 to 30 $\mu$m. Incidentally, about 0.01 to 5 $\mu$m in the depth of the track width regulating members 8 is a value given after the machining of the track width regulating members 8 as the magnetic head, while the depth before the machining is set to be in the range of about 5 to 50 $\mu$m, for instance.

Thus, the track width of each of the lower and upper magnetic poles 2 and 5 in the gap portion may be restricted to a predetermined size by determining the size of the track width regulating members.

It has to be noted that the size in the above embodiment is given as an instance, and the thin film magnetic head in the present invention is not limited to the above sizes.

The width of each track width regulating member 8 is set to be in the range of about 2 to 30 $\mu$m for the following reasons. In view of a diamagnetic field, it is preferable that the width of the track width regulating member 8 is as narrow as possible. However, each track width regulating member needs a width of at least 2 $\mu$m or more in consideration of precision of alignment in manufacture. Further, when plating is made between the track width regulating members 8, there is provided a plating layer having a large thickness in a center portion, which shows low current density in plating, and a small thickness in an end portion, which is close to each track width regulating member and shows high current density. The greater the distance between the track width regulating members 8 is, the more a difference in plating layer thickness becomes remarkable.

Since a composition of permalloy to be plated is related to a plating current value, there is a difference in permalloy composition between the center portion between the track width regulating members 8 and the end portion, and as a result, Ni content in the center portion becomes higher than that in the end portion. Preferably, the width of each track width regulating member 8 is not more than 30 $\mu$m so that difference in plating layer thickness may be not more than 200 nm and difference in permalloy composition may be not more than 0.5 wt %.

Figure 5:
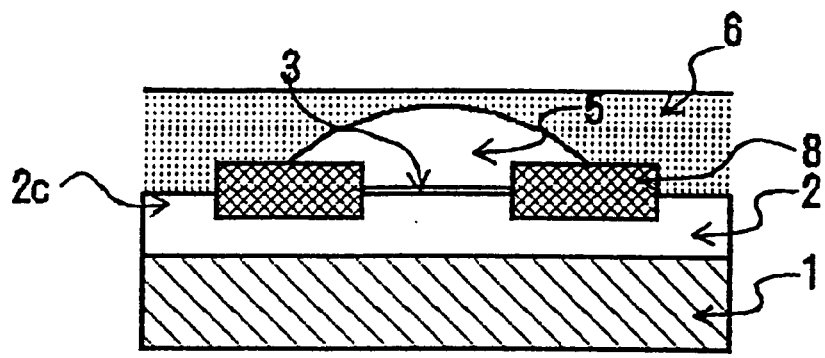
FIG. 5 is a sectional view for explaining a thin film magnetic head in another embodiment according to the present invention.
Figure 6:
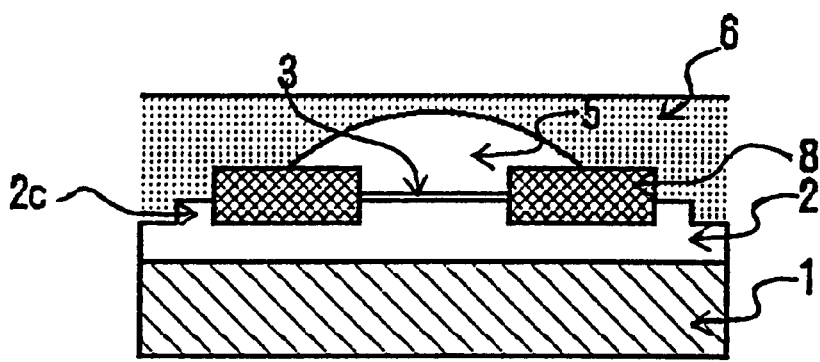
FIG. 6 is a sectional view for explaining the thin film magnetic head in another embodiment according to the present invention.

In the above configuration, as shown in the gap portion 2a, the lower magnetic pole 2 is formed only between the track width regulating members 8, while the lower magnetic pole on the outside of the track width regulating members 8 is removed by field etching. However, a lower magnetic pole 2 also may be formed on the outside of the track width regulating members 8. FIGS. 5 and 6 are the sectional views of a thin film magnetic head for explaining a configuration having the lower magnetic pole 2 on the outside of the track width regulating members 8.

In the thin film magnetic head shown in FIG. 5, a portion of the lower magnetic pole 2 is formed between the track width regulating members 8 so as to define a gap portion 7, and an outside portion 2c of the lower magnetic pole 2 is formed on the outside of the track width regulating members 8 so as to cover the whole surface of the substrate 1. In the thin film magnetic head shown in FIG. 6, a portion of the lower magnetic pole 2 is formed between the track width regulating members 8 to define the gap portion 7, and an outside portion 2c of the lower magnetic pole 2 is formed on the outside of the track width regulating members 8 so as to cover a partial surface of the substrate 1.

The thin film magnetic heads shown in FIGS. 5 and 6 may produce the similar effects to the thin film magnetic head shown in FIGS. 1 to 4.

Figure 7:
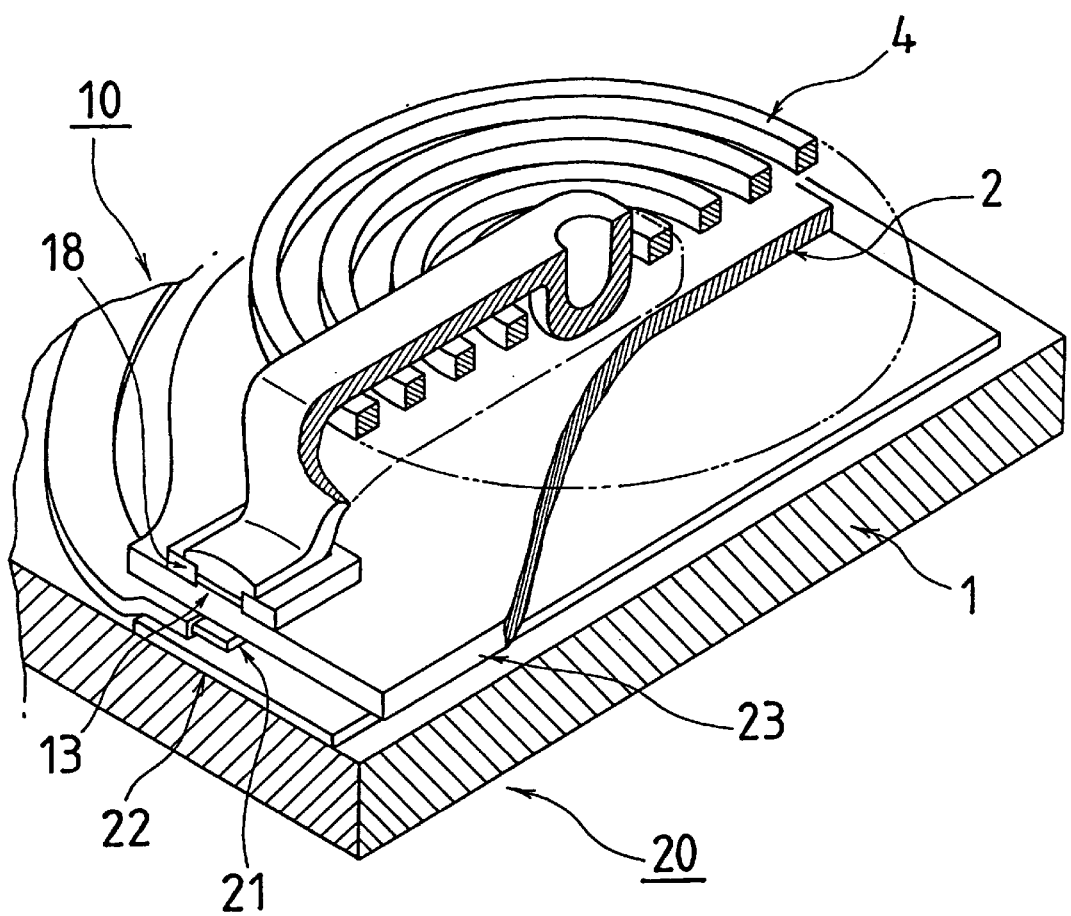
FIG. 7 is a perspective view for explaining a thin film magnetic head in a further embodiment according to the present invention.
Figure 8:
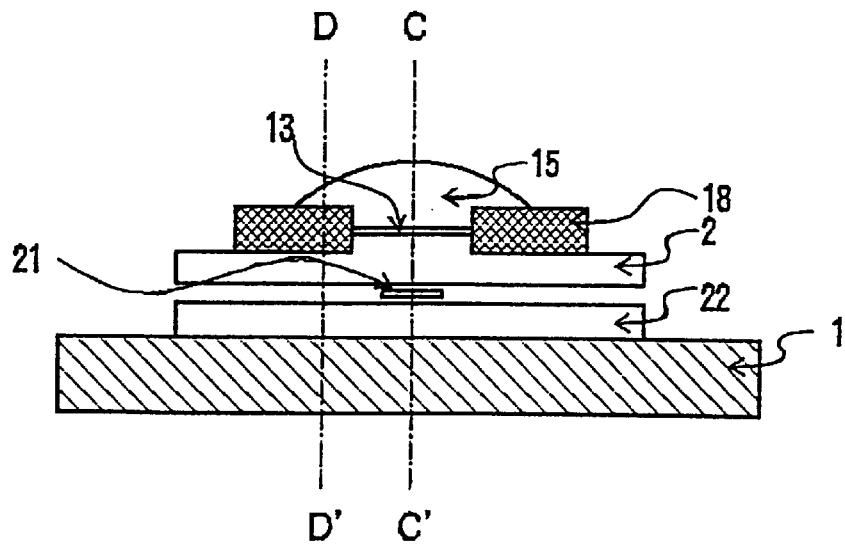
FIG. 8 is a front view for explaining the thin film magnetic head in the further embodiment according to the present invention.
Figure 9:
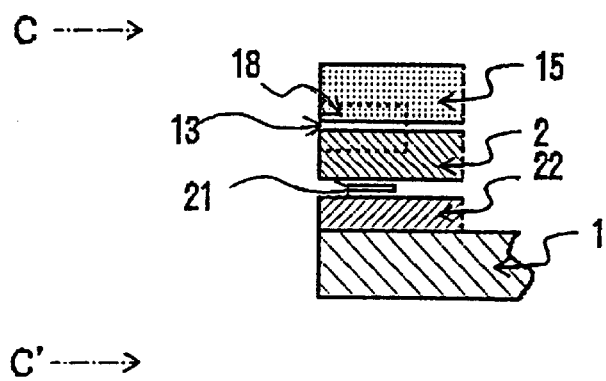
FIG. 9 is a sectional view for explaining the thin film magnetic head in the further embodiment according to the present invention.
Figure 10:
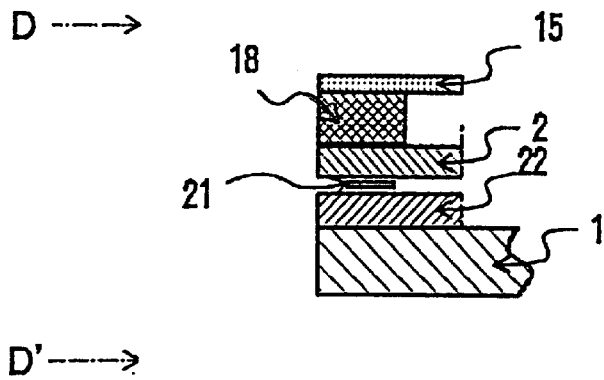
FIG. 10 is a sectional view for explaining the thin film magnetic head in the further embodiment according to the present invention.

A description will now be given of a thin film magnetic head according to another embodiment of the present invention with reference to a perspective view in FIG. 7, a front view in FIG. 8 and sectional views in FIGS. 9 and 10.

Instead of the thin film magnetic heads having the read back and recording portions united with each other as shown in FIGS. 1 to 4 and FIGS. 5 and 6, the present invention may be applied to a thin film magnetic head having the read back and recording portions separately from each other, like a thin film MR magnetic head shown in FIGS. 7 to 10.

In this thin film magnetic head, a read back portion 20 is composed of a lower shield 22, a magnetic film 21 and an upper shield 23, and a recording portion 10 is composed of a lower magnetic pole, a magnetic gap layer 13 and an upper magnetic pole 15. The upper shield 23 of the read back portion 20 is also used for the lower magnetic pole, which has a convexly planar portion of the upper end surface of the upper shield 23. A track width regulating member 18 is provided on the opposite sides of the ends of the lower magnetic pole and the upper magnetic pole 15, and the lower magnetic pole and the upper magnetic pole 15 in the gap portion are of uniform width.

Incidentally, the magnetic film 21 is an element which has a soft magnetic film showing magnetic reluctance effects, and varies in magnetic reluctance value of the magnetic film itself depending on a magnetic field change of a recording medium. Such an element includes an MR element, a spin valve element and a GMR element, for instance.

Thus, the recording portion 10 is similar in configuration to the above embodiments, and hence, the detailed description thereof will be omitted.

A description will now be given of a manufacture process of the thin film magnetic head according to the present invention with reference to FIG. 11.

In manufacture of the thin film magnetic heads shown in FIGS. 1 to 4 and FIGS. 5 and 6, the lower magnetic pole 2 is deposited on the non-magnetic substrate 1, the magnetic gap layer 3 is formed on the end 2a of the lower magnetic pole 2, the coil layer 4 resulting from depositing an insulating layer, a coil layer in the shape of a film and an insulating layer in this order is formed at the rear of the magnetic pole 2, and the upper magnetic pole 5 is deposited on the magnetic gap layer 3 and the coil layer 4.

A description will now be given of a procedure of forming the gap portion by a part of the lower magnetic pole, the magnetic gap layer and a part of the upper magnetic pole.

The non-magnetic substrate 1 is formed, and an insulating layer such as alumina is formed on the substrate 1 (FIG. 11(a)). A base portion 2b of the lower magnetic pole 2 may be formed directly on the substrate 1 or on the insulating layer such as alumina formed on the substrate 1. Incidentally, a magnetic material for the base portion 2b of the lower magnetic pole 2 may be equal to or different from a magnetic material for the lower magnetic pole 2 forming the gap portion 7.

Figure 11:
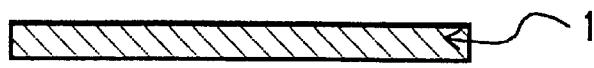
FIG. 11 is a view for explaining a process of manufacture of a thin film magnetic head according to the present invention.
Figure 11:
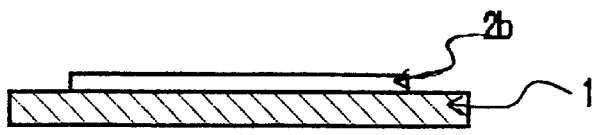
Figure 11:
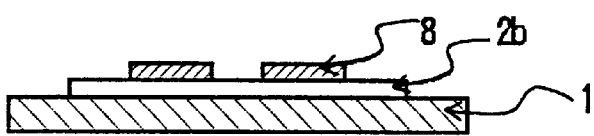
Figure 11:
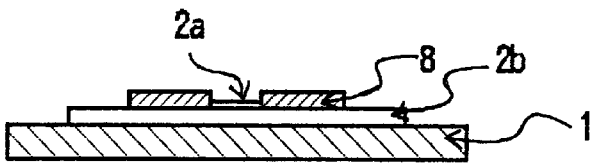
Figure 11:
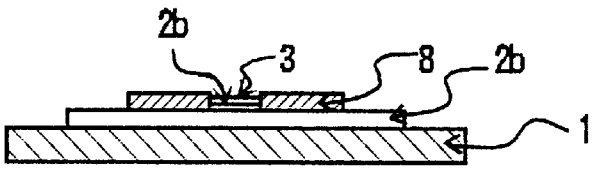
Figure 11:
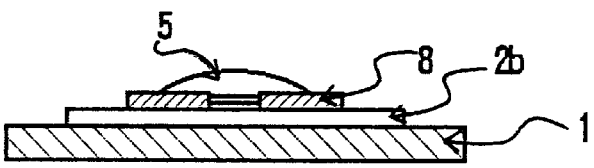
Figure 12:
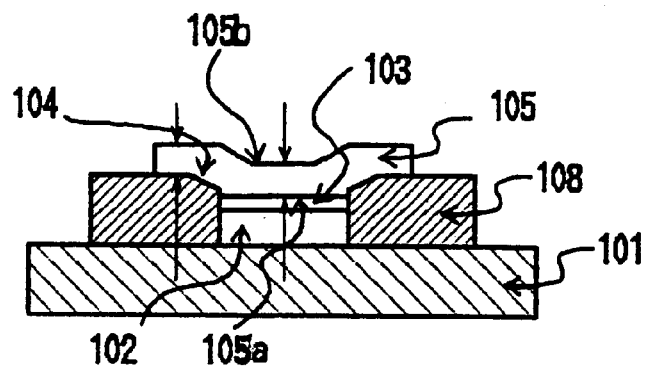
FIG. 12 is a schematic view showing a prior art thin film recording head having a track width regulating member.
Figure 13:
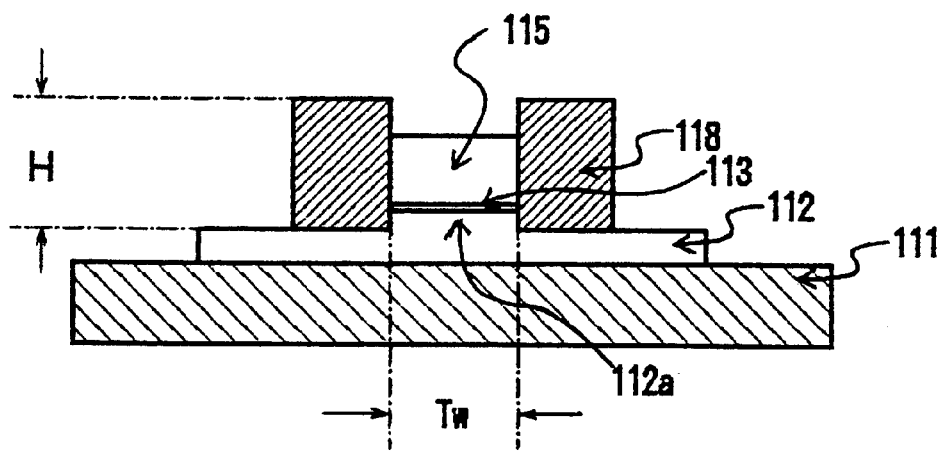
FIG. 13 is a schematic view showing another prior art thin film recording head having a track width regulating member.

After the base portion 2b of the lower magnetic pole 2 is deposited on the substrate 1 (FIG. 11(b)), the non-magnetic track width regulating member 8 is formed on the opposite sides of the gap forming positions (FIG. 11(c)) prior to formation of the gap portion of the lower magnetic pole 2, the part of the lower magnetic pole 2, the magnetic gap layer 3 and the part of the upper magnetic pole 5 are deposited between the track width regulating members 8 (FIGS. 11 (d), (e) and (f)), and the upper magnetic pole 5 is further formed by plating such as to be protuberant from the upper end surfaces of the track width regulating members 8 (FIG. 11(f)). Incidentally, the track width regulating members 8 may be left without being removed.

The track width regulating members 8 may be formed in the following procedure. $SiO_2$ is deposited by sputtering on the non-magnetic substrate 1 or the upper surface of the lower magnetic pole 2b formed on the substrate 1 to form an $SiO_2$ film which makes the track width regulating members. Subsequently, the $SiO_2$ film is coated with a resist material, which is then exposed and developed to form a resist. Then, after the $SiO_2$ film portion, which is not covered with the resist, is etched by RIE (Reactive Ion Etching), the resist is removed to form a groove portion required for forming the gap portion 7. In this manner, the pair of track width regulating members 8 are formed. Incidentally, the height of each track width regulating member 8 is determined depending on the above predetermined height of each of the magnetic poles and the magnetic gap layer in the gap portion of the thin film magnetic head.

Further, the pair of track width regulating members are used to define the gap portion. A plating seed film is formed on the whole surface including the track width regulating members by sputtering permalloy, and the lower magnetic pole in the gap portion is formed by plating the permalloy on condition that the seed film other than the track width regulating members is used as an electrode. After the resist and the seed film are removed, the lower magnetic pole is further coated with a resist material, which is then exposed and developed, and an unnecessary permalloy portion is removed by field etching to remove the resist.

Thereafter, the magnetic gap layer is formed between the track width regulating members by sputtering a gap material. After a resist is formed for flattening, the coil layer and the insulating layer are formed.

Further, after the seed film is sputtered to form a resist for removing the seed film from the track width regulating members, the seed film and the resist are removed to form a resist required for forming the upper magnetic pole, and the upper magnetic pole is then formed by plating permalloy. At this time, the permalloy layer of the upper magnetic pole is formed above the upper end surfaces of the track width regulating members after being filled in a portion above the magnetic gap layer between the track width regulating members. In forming the upper magnetic pole by plating above the upper end surfaces of the track width regulating members, the upper magnetic pole is formed so as to have the protuberant upper surface which reaches the highest level in the center line of the gap portion and is gradually lowered toward the track width regulating members according to plating isotropy.

After formation of the upper magnetic pole, the resist is removed, the upper magnetic pole is further coated with a resist material, which is then exposed and developed, and an unnecessary permalloy portion is removed by field etching to remove the resist. As a result, the gap portion is formed.

Incidentally, the coil layer in the shape of a film is formed spiral by sputtering or plating after formation of a resist of a predetermined shape. Further, the protection layer is deposited on the upper magnetic pole without removing the track width regulating members, resulting in formation of the thin film magnetic head.

Thus, the part of the lower magnetic pole, the magnetic gap layer and the part of the upper magnetic pole of the uniform width are formed in this order between the track width regulating members.

Incidentally, in manufacture of the thin film magnetic head described above, aluminum oxide, metal oxide, metal nitride and metal carbide or the like may be also available for the track width regulating members, instead of SiO$_2$.

Further, the thin film magnetic head manufacturing method described above may be also applied to the thin film magnetic head having the read back and recording portions separately from each other, like the thin film MR magnetic head.

As has been apparent from the above description of the embodiments of the present invention, according to the thin film magnetic head of the present invention, since the lower and upper magnetic poles in the gap portion may be formed to have the uniform width by the track width regulating members, side-fringing hardly occurs, resulting in improvement of recording/regeneration characteristics.

Further, since the track width regulating members are used for formation of the gap portion, it is possible to easily form the lower and upper magnetic poles in the gap portion.

According to the thin film magnetic head in the embodiments of the present invention, since formation of the track width regulating members is facilitated by reducing the height of each track width regulating member, it is possible to meet a demand for smaller track width.

According to the thin film magnetic head in the embodiments of the present invention, since the upper surface of the upper magnetic pole is formed above the upper end surfaces of the track width regulating members, and is shaped to gradually lower from the center of the gap portion toward the periphery, it is possible to prevent a cavity portion from being formed, in case of forming the protection layer on the upper surface.

Furthermore, since the upper magnetic pole is formed such that its upper and lower surfaces are not parallel to each other, it is possible to reduce undershoot in the thin film magnetic head. In addition, according to the above shape of the upper magnetic pole, a sectional area of the upper magnetic pole may be increased, resulting in reduction of magnetic reluctance in the magnetic path.

What is claimed is:

1. A thin film magnetic head having a substrate, a first magnetic pole formed on the substrate, a second magnetic pole, a coil layer connected between the first magnetic pole and the second magnetic pole, and a magnetic gap layer between the first and the second magnetic poles, comprising:

a pair of non-magnetic track width regulating members on opposite sides of each of the first and second magnetic poles and on opposite sides of the magnetic gap layer;

wherein a top surface of respective track width regulating members is positioned between a bottom surface of the second magnetic pole and a top surface of the second magnetic pole in a vertical direction of the first and second magnetic poles, wherein a part of the second magnetic pole covers at least a portion of the top surfaces of respective track width regulating members, and wherein the top surface of the second magnetic pole is protuberant from a plane including the top surfaces of respective track width regulating members toward a side opposite to the magnetic gap layer, and is shaped to reaches its highest level from the plane in the vicinity of a center line of the track width regulating members.

2. A thin film magnetic head having a substrate, a first magnetic formed on the substrate, a second magnetic pole, a coil layer connected between the first magnetic pole and a lower side of the second magnetic pole, and a magnetic gap layer between the first and the second magnetic poles, comprising:

a pair of non-magnetic track width regulating members on opposite sides of each of the first and second magnetic poles and on opposite sides of the magnetic gap layer;

wherein a top surface of respective track width regulating members is positioned between a bottom surface of the second magnetic pole and a top surface of the second magnetic pole in a vertical direction of the first and second magnetic poles, wherein the bottom surface of the second magnetic pole and the top surface of the second magnetic pole are not parallel to each other, and wherein the top surface of the second magnetic pole is protuberant from a plane including the top surfaces of respective track width regulating members toward a side opposite to the magnetic gap layer, and is shaped to vicinity of a center line of the track width regulating members.

3. A thin film magnetic head according to claim 1 or 2, wherein the thin film magnetic head further comprises a read back portion and a separate recording portion, wherein the recording portion includes the track width regulating members.

4. A thin film magnetic head according to claim 1 or 2, wherein a portion of the first magnetic pole facing the magnetic gap layer and a portion of the second magnetic pole facing the magnetic gap layer are of uniform width.

5. A thin film magnetic head according to claim 1 or 2, wherein the track width regulating members comprise at least one of silicon oxide, aluminum oxide, metal oxide, metal nitride and metal carbide.

6. A thin film magnetic head according to claim 1 or 2, wherein the top surface of the second magnetic pole is covered with a protection layer, and the protection layer is substantially equal in grinding properties to the track width regulating members.

* * * * *